Feb. 14, 1956 — D. C. JALBERT — 2,734,706
MULTICELL PARACHUTE CANOPY
Filed Oct. 17, 1952 — 3 Sheets-Sheet 1

Domina C. Jalbert,
INVENTOR.

BY
ATTORNEYS.

Feb. 14, 1956   D. C. JALBERT   2,734,706
MULTICELL PARACHUTE CANOPY
Filed Oct. 17, 1952   3 Sheets-Sheet 2

INVENTOR,
Domina C. Jalbert
BY
*E. E. Vrooman & Co.,*
ATTORNEYS.

Feb. 14, 1956 D. C. JALBERT 2,734,706
MULTICELL PARACHUTE CANOPY
Filed Oct. 17, 1952 3 Sheets-Sheet 3
Fig. 5.
Fig. 6.
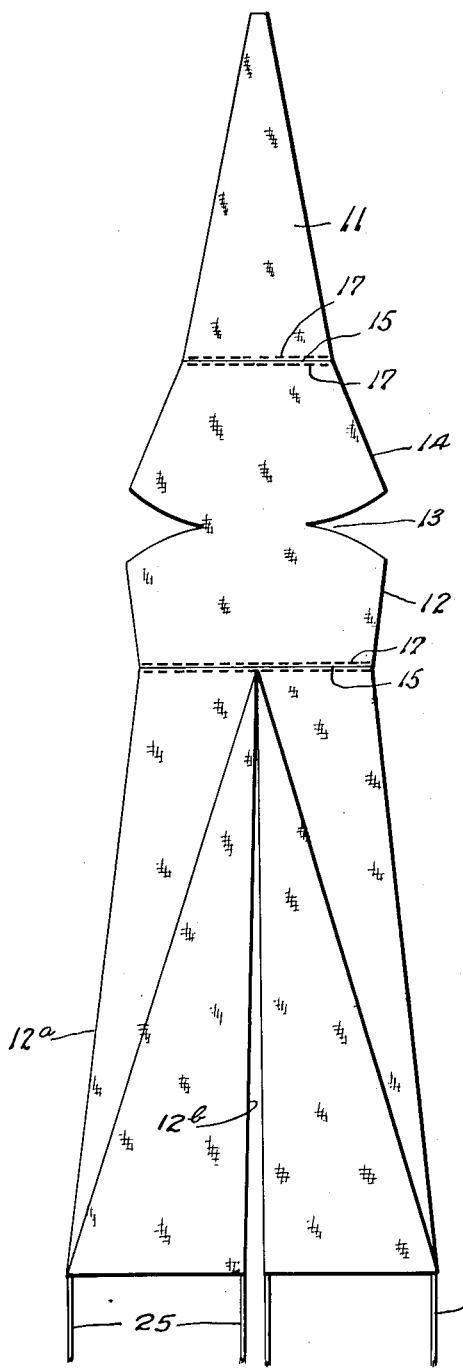
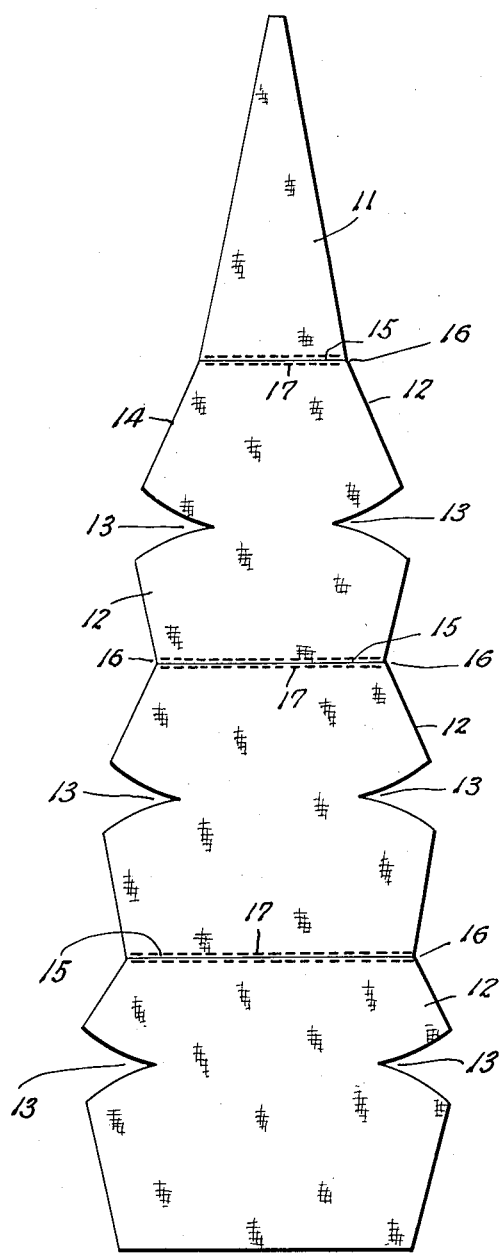
INVENTOR,
Domina C. Jalbert.
BY
ATTORNEYS

United States Patent Office 2,734,706
Patented Feb. 14, 1956

2,734,706

MULTICELL PARACHUTE CANOPY

Domina C. Jalbert, Boca Raton, Fla.

Application October 17, 1952, Serial No. 315,391

6 Claims. (Cl. 244—145)

This invention relates to parachutes and has special reference to what is termed a multi-cellular parachute. One important object of this invention is to provide an improved cellular parachute having an opening characteristic such that the opening will occur more quickly than in the ordinary and known types of parachute.

Another object of the invention is to provide a novel form of parachute which, for a given diameter, will hold more volume of air and have a lower descensional rate over the common forms of parachutes.

A third important object of the invention is to provide an improved form of parachute wherein the shock of opening is minimized.

A fourth important object of the invention is to provide a novel form of parachute wherein the oscillation common to such devices is minimized and practically eliminated.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and—

Fig. 5 is a view showing the lay-out of the controllable panel.

Fig. 6 is a plan view of one panel of the parachute as assembled.

Figure 1:
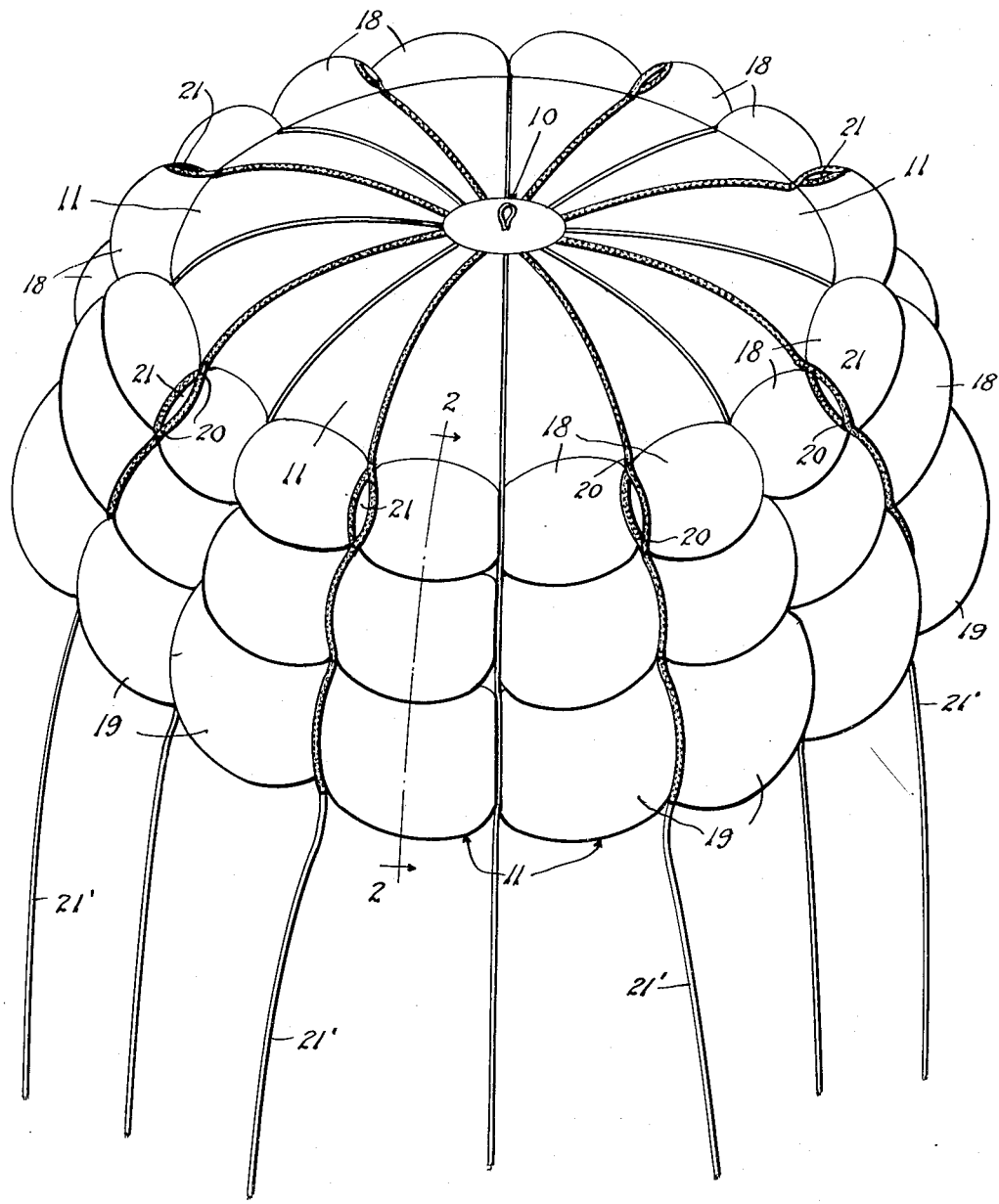
Fig. 1 is a perspective view of a parachute constructed in accordance with this invention.
Figure 2:
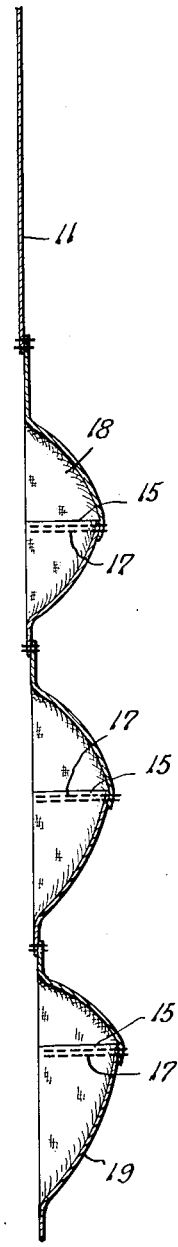
Fig. 2 is a detailed fragmentary section on the line 2—2 of Fig. 1.

As shown in Fig. 1, the parachute is of general dome-shape and consists essentially of a central portion 10 forming an impervious top part of the dome. Extending outwardly and downwardly around the central portion or cap 10 are certain panel arrangements indicated in general at 11. Each of these panel arrangements tapers from the end adjacent the cap to the peripheral edge of the parachute. As shown in Fig. 5, these panels are built up from a series of sections 12 of regular trapezoidal shape. Each of these sections 12 has a gore 13 cut into each side; from the angles of this gore the edges of the section are cut to taper inwardly as at 14. The top and bottom edges of successive pocket edges are stitched together on fold lines 15 so that a shallow gore portion 16 is formed at the junction of any two sections. The edges of the gore portions 13 are then brought together and held by stitch lines 17 (Fig. 2) so that there is formed a series of outwardly projecting pockets 18, which are completely open to the interior of the dome-shaped structure. It will be observed that these pockets, as shown best in Figs. 1 and 2, have respective increasing capacity from the pocket 18, adjacent the cap to the pocket 19 adjacent the periphery in each panel.

Figure 3:
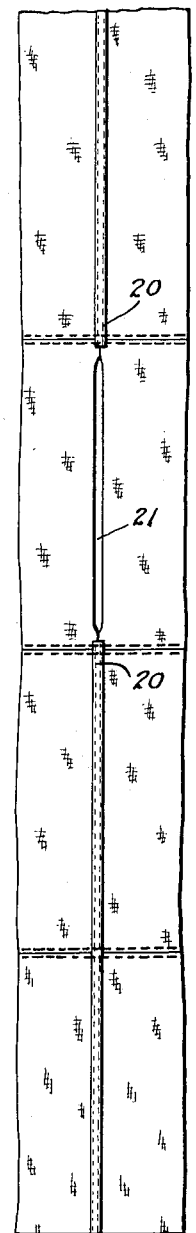
Fig. 3 is a fragmentary view showing the arrangement of air escape openings in a parachute of this character.
Figure 4:
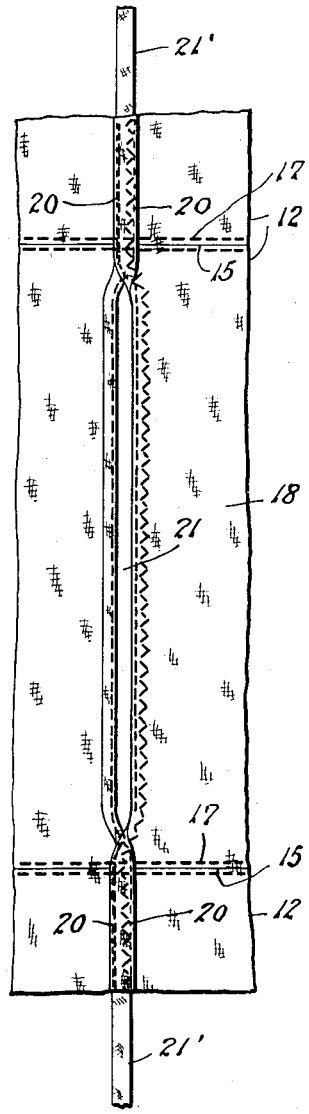
Fig. 4 is an enlarged fragmentary view of a portion of Fig. 3.

The side edges of each panel of the dome are sewed to the side edges of the adjacent panel on each side as by stitch lines 20. In certain of the arrangements of the stitch lines 20, as shown in Figs. 3 and 4, the stitch lines do not run continuously to tie together all of each pair of edge portions but in certain of the arrangements thus made the stitching is arranged to provide air outlets 21. These air outlets will vary in length in accordance with the amount of air which is to be allowed to escape during the time the parachute drops. Furthermore, while these air outlets are arranged as interruptions to the lines 20, which connect the panels to each other, the outlets may be spaced around the parachute at proper distances to provide for the correct loss of air desired or they may be located in each of the junctures of the panels.

Connected to the cap 10 are carrier lines 21', which are secured between certain of the adjacent edges of the panels and depend in the usual manner from the edge of the parachute.

Because of the greater volume capacity for air of this parachute over the ordinary plain parachute, the filling of the parachute takes place much more slowly than is the case with the ordinary type of parachute where the top of the parachute has a center opening. This not only effects a slower opening of the parachute to reduce the shock on the user, but the pressure created by the drop through the air pushes the fabric outward gradually allowing the canopy to be fully expanded.

Moreover the gradual opening above referred to and the shape of the parachute causes the pressure expanding the periphery of the parachute to increase as the altitude of the parachute decreases whereupon the valving effect of the escape slots goes into action and produces a uniform pressure all over the interior of the parachute in both vertical and circumferential directions.

The air being only allowed to escape laterally and the escape means being evenly distributed around the dome, there will be no tendency for the parachute to oscillate, since this equalized pressure on all sides means stability.

Under these circumstances the combination of trapped air with slow and uniform escape causes the parachute to have a very slow descension rate.

It is obvious that minor changes may be made in the form and construction of this invention without departing from the material principles thereof. It is not therefore desired to confine the invention to the exact form herein shown and described, but it is wished to include all such as properly come within the scope claimed.

Referring to Figure 5, this controllable system is optional on the canopy. It is to be used (or applied) only for live jump chutes when directional controls are required. Cords 25 extending downwardly from the lower end of a panel 12ª, which is split at 12ᵇ, are adapted to be manipulated by the jumper for varying the drag of the panel to govern the lateral direction of movement of the parachute.

What is claimed is:

1. A parachute comprising a dome-shaped sheet having a central imperforate portion and a series of panels extending outwardly from said central portion, each of said panels being constituted by a series of cup-shaped pockets, the side edges of each panel being connected to corresponding edges of the adjacent panels, the connections between said panels having air escape slits spaced around the dome-shaped sheet between the connections adjacent the center and the connections adjacent the periphery of the sheet.

2. A parachute comprising a dome-shaped sheet having a central imperforate portion and a series of panels extending outwardly from said central portion, each of said panels being constituted by a series of cup-shaped pockets, the side edges of each panel being connected to corresponding edges of the adjacent panels, the pockets of each panel being fully open on the inner face of the panel, the connections between said panels having air escape slits spaced around the dome-shaped sheet between the connections adjacent the center and the connections adjacent the periphery of the sheet.

3. A parachute comprising a dome-shaped sheet having a central imperforate portion and a series of panels extending outwardly from said central portion, each of said panels being constituted by a series of cup-shaped pockets, the side edges of each panel being connected to corresponding edges of the adjacent panels, the pockets of each panel being fully open on the inner face of the panel, and increasing respectively in capacity from the pocket nearest the center of the sheet to the pocket nearest the periphery, the connections between said panels having air escape slits spaced around the dome-shaped sheet between the connections adjacent the center and the connections adjacent the periphery of the sheet.

4. A parachute comprising a dome-shaped sheet having a central imperforate portion and a series of panels extending outwardly from said central portion, each of said panels being constituted by a series of cup-shaped pockets, the side edges of each panel being connected to corresponding edges of the adjacent panels, the connections between said panels having air escape slits spaced around the dome-shaped sheet between the connections adjacent the center and the connections adjacent the periphery of the sheet, and supporting lines extending from points adjacent the center of the sheet and extending along lines located between adjacent panels along the connected edges thereof.

5. A parachute comprising a dome-shaped sheet having a central imperforate portion and a series of panels extending outwardly from said central portion, each of said panels being constituted by a series of cup-shaped pockets, the side edges of each panel being connected to corresponding edges of the adjacent panels, the pockets of each panel being fully open on the inner face of the panel, the connections between said panels having air escape slits spaced around the dome-shaped sheet between the connections adjacent the center and the connections adjacent the periphery of the sheet, and supporting lines extending from points adjacent the center of the sheet and extending along lines located between adjacent panels along the connected edges thereof.

6. A parachute comprising a dome-shaped sheet having a central imperforate portion and a series of panels extending outwardly from said central portion, each of said panels being constituted by a series of cup-shaped pockets, the side edges of each panel being connected to corresponding edges of the adjacent panels, the pockets of each panel being fully open on the inner face of the panel, and increasing respectively in capacity from the pocket nearest the center of the sheet to the pocket nearest the periphery, the connections between said panels having air escape slits spaced around the dome-shaped sheet between the connections adjacent the center and the connections adjacent the periphery of the sheet, and supporting lines extending from points adjacent the center of the sheet and extending along lines located between adjacent panels along the connected edges thereof.

References Cited in the file of this patent

UNITED STATES PATENTS

| 1,498,780 | Broadwick | June 24, 1924 |
| 1,862,247 | Tricau | June 7, 1932 |
| 1,890,083 | Graeff | Dec. 6, 1932 |
| 2,384,416 | Derry | Sept. 4, 1945 |

FOREIGN PATENTS

| 818,873 | France | June 28, 1937 |